US011451410B2

(12) United States Patent
Jerolm

(10) Patent No.: US 11,451,410 B2
(45) Date of Patent: Sep. 20, 2022

(54) SUBSCRIBER IN A BUS SYSTEM, METHOD FOR OPERATION AND A BUS SYSTEM

(71) Applicant: WAGO VERWALTUNGSGESELLSCHAFT MIT BESCHRAENKTER HAFTUNG, Minden (DE)

(72) Inventor: Daniel Jerolm, Bad Essen (DE)

(73) Assignee: WAGO Verwaltungsgesellschaft mit beschraenkter Haftung, Minden (DE)

(*) Notice: Subject to any disclaimer, the term of this patent is extended or adjusted under 35 U.S.C. 154(b) by 215 days.

(21) Appl. No.: 16/900,517

(22) Filed: Jun. 12, 2020

(65) Prior Publication Data
US 2020/0313926 A1 Oct. 1, 2020

Related U.S. Application Data

(63) Continuation of application No. PCT/IB2018/059654, filed on Dec. 5, 2018.

(30) Foreign Application Priority Data
Dec. 12, 2017 (DE) .................. 10 2017 011 458.7

(51) Int. Cl.
*H04L 12/40* (2006.01)
*H04J 3/06* (2006.01)

(52) U.S. Cl.
CPC ...... *H04L 12/40026* (2013.01); *H04J 3/0655* (2013.01); *H04J 3/0664* (2013.01); *H04J 3/0697* (2013.01); *H04L 2012/4026* (2013.01)

(58) Field of Classification Search
CPC ........ H04L 12/40026; H04L 2012/4026; H04J 3/0655; H04J 3/0664; H04J 3/0697; H04J 3/0673
See application file for complete search history.

(56) References Cited

U.S. PATENT DOCUMENTS 5,991,308 A * 11/1999 Fuhrmann ............... H04J 13/00
348/E7.07
6,421,710 B1 7/2002 Jasperneite et al.
(Continued)

FOREIGN PATENT DOCUMENTS

DE 19726763 C2 6/1999
DE 19917354 A1 10/2000
(Continued)

OTHER PUBLICATIONS

Xaver Schmidt: "Profinet: Kürzere Zykluszeiten eröffnen neue Anwendungsfelder," ETZ (Elektotechnik & Automation), vol. May 2012.
(Continued)

*Primary Examiner* — Hoang-Chuong Q Vu
(74) *Attorney, Agent, or Firm* — Muncy, Geissler, Olds & Lowe, P.C.

(57) ABSTRACT

A bus system, a method for operating a bus system and a participant of a bus system are provided. The participant includes a timer and a transceiver circuit. The transceiver circuit is configured to receive a data packet having a time stamp value via a bus. The timer is configured for synchronization, based on the time stamp value. The timer is configured to change the time stamp value. The transceiver circuit is configured to transmit the data packet with the changed time stamp value via the bus.

14 Claims, 3 Drawing Sheets

(56) References Cited

U.S. PATENT DOCUMENTS

| | | | |
|---|---|---|---|
| 6,611,537 B1* | 8/2003 | Edens | H04N 21/4363 |
| | | | 375/E7.274 |
| 7,012,980 B2 | 3/2006 | Franke et al. | |
| 7,103,805 B2 | 9/2006 | Belschner et al. | |
| 7,668,994 B2 | 2/2010 | Albrecht et al. | |
| 7,792,158 B1* | 9/2010 | Cho | H04J 3/0664 |
| | | | 370/518 |
| 7,848,360 B2 | 12/2010 | Götz et al. | |
| 8,126,019 B2 | 2/2012 | Schultze | |
| 8,149,880 B1* | 4/2012 | Cho | H04N 21/43615 |
| | | | 370/256 |
| 9,514,073 B2 | 12/2016 | Hartwich et al. | |
| 9,681,407 B2 | 6/2017 | Tian et al. | |
| 9,713,109 B2 | 7/2017 | Buhl et al. | |
| 10,430,400 B1* | 10/2019 | Bennett | G06F 16/2322 |
| 2002/0186716 A1* | 12/2002 | Eidson | H04J 3/0664 |
| | | | 370/496 |
| 2005/0180466 A1* | 8/2005 | Franchuk | H04J 3/0664 |
| | | | 370/503 |
| 2007/0081514 A1* | 4/2007 | Shirakura | H04J 3/0682 |
| | | | 370/503 |
| 2012/0159237 A1* | 6/2012 | Skrodzki | G08B 29/16 |
| | | | 714/E11.072 |
| 2013/0080820 A1* | 3/2013 | Swoboda | G06F 1/04 |
| | | | 710/305 |
| 2014/0143582 A1* | 5/2014 | Kindred | H04W 56/005 |
| | | | 713/400 |
| 2016/0080031 A1* | 3/2016 | Kassel | H04B 3/32 |
| | | | 379/406.06 |
| 2016/0170441 A1* | 6/2016 | McGaughey | H04L 67/125 |
| | | | 713/401 |
| 2017/0041127 A1* | 2/2017 | Sharpe-Geisler | G01S 15/46 |
| 2017/0059636 A1* | 3/2017 | Kerger | H02H 7/263 |
| 2017/0064651 A1* | 3/2017 | Volkov | H04L 47/30 |
| 2017/0237512 A1* | 8/2017 | Galea | H04J 3/0644 |
| | | | 370/350 |
| 2017/0251059 A1* | 8/2017 | Sawada | H04L 67/1095 |
| 2017/0359139 A1* | 12/2017 | Butterworth | H04J 3/0664 |
| 2018/0145849 A1* | 5/2018 | Tam | H04L 12/42 |

FOREIGN PATENT DOCUMENTS

| | | |
|---|---|---|
| DE | 10148325 A1 | 4/2003 |
| DE | 102004055105 A1 | 5/2006 |
| DE | 102010041363 A1 | 3/2012 |
| DE | 102013218328 B3 | 6/2014 |
| DE | 102013020802 A1 | 8/2014 |
| EP | 1748338 A1 | 1/2007 |
| EP | 1881652 A1 | 1/2008 |
| EP | 2034642 A1 | 3/2009 |
| EP | 1368728 B1 | 1/2010 |
| EP | 3087788 B1 | 9/2017 |

OTHER PUBLICATIONS

International Search Report dated Feb. 20, 2019 in corresponding application PCT/IB2018/059654.

German Office Action dated Nov. 13, 2018 in corresponding application 10 2017 011 458.7—partial translation identifies relevant portion of cited document Xaver Schmidt: Profinet: Kürzere Zykluszeiten eröffnen neue Anwendungsfelder, ETZ (Elektrotechnik & Automation), vol. May 2012.

Shuai, Ji et al: "Frame Forward Mechanism of a Real-time Ethernet", 2013, IEEE International Conference on Signal Processing, Communication and Computing (ICSPCC 2013).

* cited by examiner

SUBSCRIBER IN A BUS SYSTEM, METHOD FOR OPERATION AND A BUS SYSTEM This nonprovisional application is a continuation of International Application No. PCT/I62018/059654, which was filed on Dec. 5, 2018, and which claims priority to German Patent Application No. 10 2017 011 458.7, which was filed in Germany on Dec. 12, 2017, and which are both herein incorporated by reference.

BACKGROUND OF THE INVENTION

Field of the Invention

The present invention relates to a participant of a bus system, a method for operating a bus system, and a bus system.

Description of the Background Art

Synchronization methods for bus systems are known in the prior art.

DE 10 2013 020 802 A1 relates to a method for a reference message-based time synchronization in a CAN network of a motor vehicle, in which a sync message provided with an item of time stamp information and subsequently a message for transmitting the transmitter-side time stamp information are transmitted from a time master to a time slave. In a method in which the bus load is reduced, an existing, cyclically transmitted CAN message is used as the sync message.

A synchronization method and a communication system corresponding therewith as well as a main unit and a secondary unit of a communication system of this type are known from DE 199 17 354 A1. Internal timers of a main unit and at least one secondary unit are to be synchronized with each other. For this purpose, the main unit transmits time signals to the secondary unit via two communication paths. These time signals require propagation times to the secondary unit on the two communication paths. The difference between the propagation times is detected at least in the secondary unit. The propagation times are ascertained from the difference. Afterwards the timers synchronize themselves, taking the propagation times into account.

EP 1 368 728 B1, which corresponds to U.S. Pat. No. 7,012,980, and which relates to a synchronous, clocked communication system, for example a distributed automation system, whose participants may be any automation components and which are coupled with each other via a data network for the purpose of exchanging data with each other. All possible bus systems, such as a field bus, professional field bus, Ethernet, Industrial Ethernet, etc. are conceivable as the data network of the communication system. One participant of the communication system is designated as the timing generator and ensures the distribution and maintenance of the employed communication clock to all participants and from all participants. The timing generator may also introduce a relative clock into the entire communication system for all participants via the same mechanism. This participant is thus also the master of the relative clock or the applicable relative time. All participants of the communication system are thus permanently synchronized to the relative clock with the valid relative time, which is applicable system-wide, and therefore have the same understanding of time at any time. The implementation of applicative sequences, synchronization of simultaneously occurring events, time accuracy in detecting events or switching of outputs are thus to be significantly improved thereby or made possible in the first place.

A method for locating a frequency deviation in a communication network is known from DE 10 2013 218 328 B3, which corresponds to U.S. Pat. No. 9,713,109. A reference node and the individual network nodes communicate with each other in series, synchronization messages being transmitted from the reference node to the network node and from the network node to the next network node, etc. up to the last network node. To obtain an exact time synchronization in the individual network nodes, the reference clock count state in the synchronization messages must be updated in the individual network nodes. A time delay is therefore known in each network node, which is needed between the transmission of a synchronization message SM from the preceding network node (or the reference node) and the transmission of the synchronization message from the particular network node to the next network node. This time delay is made up of two time periods, these time periods being able to be different for each network node. The first of these is the time period which is needed for transmitting the message from the preceding network node to the particular network node (line delay). The second is a processing time, which is needed in the network node for processing a received synchronization message up to the transmission of the synchronization message in a new telegram to the next network node (bridge delay). This delay time is indicated in the particular network node in clock pulses according to the node clock frequency.

It is known from "Frame Forward Mechanism of a Real-Time Ethernet", 2013, IEEE International Conference on Signal Processing, Communication and Computing (ICSPCC 2013), that data is transmitted from a master to the slaves in a downstream frame. A forwarding channel is provided in each slave, which forwards the frame directly to the next slave without modifications. An upload stream is used to collect the data of the slaves. Each slave appends its data to the end of the frame.

SUMMARY OF THE INVENTION

It is therefore an object of the present invention to specify a participant of a bus system, which is configured for a preferably improved synchronization.

Accordingly, a participant of a bus system, which includes a timer and a transceiver circuit, is provided. The participant is configured to communicate with other participants of the bus system. The timer enables the participant to carry out actions at certain points in time, for example to output control data at output terminals or to sample measurement data.

The transceiver circuit is configured to receive a data packet having a time stamp value via a bus. The participant is advantageously configured to additionally receive and possibly transmit other data packets—for example, including process data—with the aid of the transceiver circuit. The data packet with the time stamp value is assigned to the timer, for example with the aid of an identifier.

The timer is configured for synchronization based on the time stamp value. For synchronization purposes, for example a time value of a time counter is matched to the time stamp value, possibly incorporating an offset value, and thus continues to run similarly to a clock.

The timer is configured to change the time stamp value. To change the time stamp value, the latter is overwritten, for example.

The transceiver circuit is configured to transmit the data packet with the changed time stamp value via the bus. The transmitted data packet is the received data packet. The participant is not configured to generate a data packet having a time stamp. The same data packet that was received is transmitted, but with changed data.

The transceiver circuit can be configured to transmit a first part of the data packet via the bus and to simultaneously receive a second part of the data packet via the bus. The delay by the transceiver circuit between receipt and transmission is therefore significantly shorter than the receipt of the entire data packet. For example, the delay is only a few clock cycles. However, the data packet is not purely forwarded, but instead the data packet is changed during the receipt and transmission, at least in that the time stamp value is changed. In addition, a cyclic redundancy check (CRC) may also be changed. However, this is the same data packet, since no new data packet is generated by the participant.

The data packet includes a large number of data symbols. A data symbol has an, in particular, fixed number of bits. For example, a data symbol has 4, 8, 16 or 32 bits. The time stamp value of the data packet advantageously includes a plurality of data symbols. The transceiver circuit is advantageously configured to receive and to transmit the data packet symbol by symbol. Due to the symbol-by-symbol receipt and transmission, a data symbol is preferably received and immediately transmitted again, so that only exactly one fixed subset of data symbols, in particular only exactly one data symbol, is preferably waiting to be processed in the participant. The symbol-by-symbol receipt and transmission of the data packet preferably takes place in such a way that the transmission of one data symbol of the data packet and the receipt of a subsequent data symbol of the data packet take place simultaneously. The transceiver circuit of the participant is preferably configured to receive and to transmit the bits of a data symbol serially.

The timer of the participant can be configured to change the first received data symbol of the time stamp value having the least significant bit and to transmit it to a subsequent participant before receiving the data symbol of the time stamp value having the most significant bit.

The timer includes a time counter. The timer advantageously includes a state machine. The state machine may also be referred to as an automatic state changer. The state machine is advantageously configured to synchronize the time counter, based on the received time stamp value. The state machine is advantageously configured to change the time stamp value.

The participant includes an, in particular, non-volatile memory for storing a correction value. The change of the time stamp value is based on the stored correction value.

The correction value can be based on a delay between the receipt and the transmission of a beginning of the data packet by the transceiver circuit and on a delay due to the transmission via a transmission path of the bus, in particular to the subsequent participant. The correction value ideally corresponds to the total delay by the participant inserted into the bus. If the participant is removed from the bus, the delay and the correction value overwhelmingly, ideally completely, cancel each other out. The subsequent participant may hereby receive the at least approximately correct time stamp value even in the case of a remote participant. The correction value is advantageously constant for multiple consecutive data packets. This does not rule out the fact that the correction value is changed if, for example, the transmission path changes. After the change of the correction value, the latter, in turn, is constant for consecutive data packets.

The object of the present invention is also to specify a method for operating a bus system. which effectuates a preferably improved synchronization.

Correspondingly, a method is provided for operating a bus system, which comprises a first participant and a second participant.

In the method, a data packet is received and transmitted by the first participant. It is not necessary for the data packet to be completely received prior to transmission. A first previously received part of the data packet is preferably already transmitted by the first participant before a second part of the data packet is received by the first participant.

In the method, a timer of the first participant is synchronized, based on a time stamp value contained in the data packet.

In the method, a time stamp value is changed by the first participant.

In the method, the changed time stamp value is transmitted by the first participant to a second participant with the aid of the data packet.

The time stamp value can be changed by the first participant during the transmission and the receipt of the data packet. A very fast synchronization of all timers in the bus system may be achieved hereby, the total synchronization being significantly influenced by the minimal delay of the individual participants.

A propagation time delay caused by the first participant can be ascertained before the data packet is received by the first participant. The ascertainment of the propagation time delay takes place, for example, by an external device, by the first participant itself and/or by another participant of the bus system. A correction value is advantageously ascertained, based on the ascertained propagation time delay. The correction value is advantageously stored. The change of the time stamp value is advantageously based on the stored correction value.

The changed time stamp value can be determined by a function having the received time stamp value and the correction value. The changed time stamp value is advantageously determined by a sum of the received time stamp value and the correction value.

The object of the present invention is also to specify a bus system, which is configured for a preferably improved synchronization.

As a result, a bus system is provided, which comprises a first participant designed as a first slave, a second participant designed as a second slave, a master and a bus.

The master and the first slave and the second slave are connected via the bus for transmitting a data packet in such a way that the data packet transmitted by the master passes through the first slave and the second slave in a fixed sequence. For example, the data packet passes in the sequence of the first slave first and then the second slave.

The master can be configured to transmit a time stamp value in the data packet.

The first slave can be configured to receive the data packet having the time stamp value.

The first slave can be configured to synchronize its timer, based on the time stamp value.

The first slave can be configured to change the time stamp value and to transmit the changed time stamp value to the second slave in the data packet.

The second slave can be configured to receive the data packet having the changed time stamp value and to synchronize its timer, based on the changed time stamp value.

The bus system includes a first interface device. The first slave is advantageously removable from the bus system by detaching it from the first interface device. The first interface device advantageously includes a first switching device, which effectuates a bypass to the second slave. If the first slave is removed, the first data packet is thus not receivable by the first slave but rather by the second slave having an unchanged time stamp value.

The bus system can have a number of additional slaves. The data packet advantageously passes through all slaves of the bus system in a fixed sequence. Each slave is advantageously configured to change the time stamp value in the data packet and to forward the changed time stamp value to the subsequent slave in the sequence via the bus. The last slave in the sequence is advantageously configured to transmit the data packet back to the master via the bus.

The master includes a master timer. The master is advantageously configured to generate the data packet and to determine the time stamp value, based on the master time, and to enter it into the data packet.

The master includes a bus interface to a higher-level bus. The master is advantageously configured to synchronize its master timer, based on a telegram received via the higher-level bus. The telegram and the data packet are different. For example, the telegram and the data packet have different protocols.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
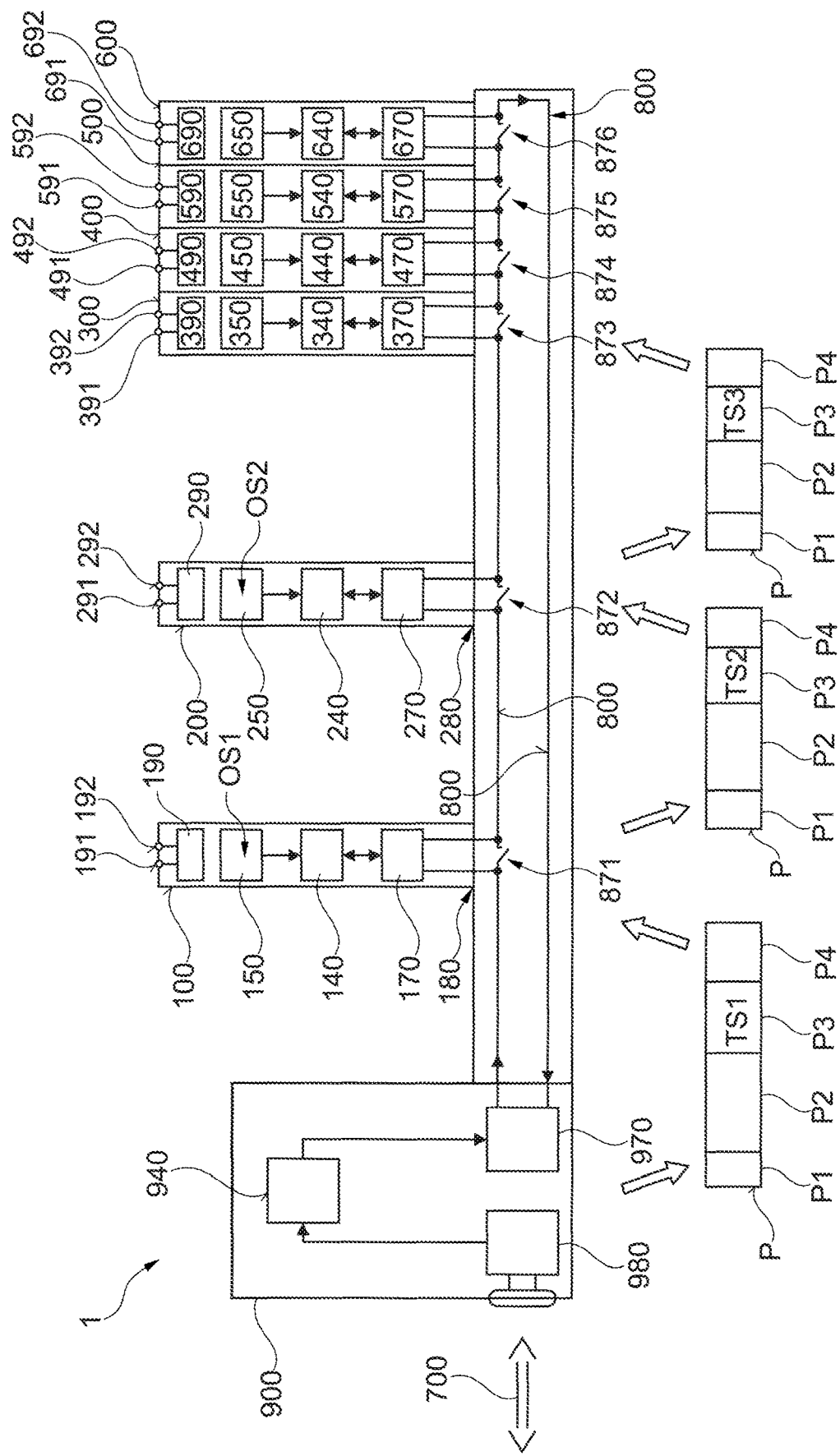
FIG. 1 shows a schematic representation of a bus system.

A schematic representation of a bus system 1 is shown in FIG. 1. Bus system 1 comprises a master 900, designed as a coupler, a first slave 100, a second slave 200 and a number of additional slaves 300, 400, 500, 600. Master 900 may also be referred to as a controller or head station. Slaves 100, 200, 300, 400, 500, 600 may also be referred to as I/O modules. In the exemplary embodiment in FIG. 1, bus system 1 is designed as a master/slave bus system, master 900 being connected to slaves 100, 200, 300, 400, 500, 600 via bus 800 for the purpose of transmitting a data packet P.

In the exemplary embodiment in FIG. 1, data packet P transmitted by master 900 passes through slaves 100, 200, 300, 400, 500, 600 in a fixed sequence. In the exemplary embodiment in FIG. 1, it is shown that data packet P first passes through first slave 100, then through second slave 200, then through third slave 300, then through fourth slave 400, then through fifth slave 500 and finally through sixth slave 600 in a fixed sequence. If a slave is added or if one of the existing slaves is deactivated or removed from the bus, the sequence changes, and data packet P would pass through in a new fixed sequence. The sequence is fixed insofar as all slaves 100, 200, 300, 400, 500, 600 participating in the bus communication remain in the same place and are activated.

Master 900 includes a master timer 940. Master 900 is configured to generate data packet P with the aid of a transceiver circuit 970 and transmit it on bus 800. Master 900 is configured to transmit a time stamp value TS1 in data packet P. Data packet P is illustrated schematically in the exemplary embodiment in FIG. 1. Data packet P has a header P1, data fields P2, P3 and a field P4 for a cyclic redundancy check (CRC). Time stamp value TS1 transmitted by master 900 is shown in data field P3.

First slave 100 includes a transceiver circuit 170. First slave 100 also includes a timer 140, a memory area 150 and an input/output circuit 190. Input/output circuit 190 is connected to terminals 191, 192 for connecting cables, light conductors or the like for the purpose of reading in or outputting analog and/or digital input and/or output signals for a process. First slave 100 further includes an electrical and mechanical interface device 180 for detachment from and connection to bus 800.

Additional slaves 200, 300, 400, 500, 600 may have a similar or identical design. Each slave 100, 200, 300, 400, 500, 600 correspondingly includes an interface device 180, 280, 380, 480, 580, 680, a transceiver circuit 170, 270, 370, 470, 570, 670, a timer 140, 240, 340, 440, 540, 640, a memory area 150, 250, 350, 450, 550, 650 an input/output circuit 190, 290, 390, 490, 590, 690 and possibly inputs and/or outputs 191, 192, 291, 292, 391, 392, 491, 492, 591, 592, 691, 692 for connecting external devices. The invention is not limited to the number of slaves 100, 200, 300, 400, 500, 600 in bus system 1 illustrated in FIG. 1. A smaller or larger number of slaves may be provided, depending on the application. It is shown in FIG. 1 that additional slaves (not illustrated) may be inserted into bus system 1 between first master 900, first slave 100, second slave 200 and third slave 300.

Data packet P transmitted by master 900 reaches first slave 100 via bus 800. First slave 100 is configured to receive data packet P having time stamp value TS1 transmitted by master 900 with the aid of transceiver circuit 170. First slave 100 includes timer 140 connected to transceiver circuit 170 and is configured to synchronize its timer 140, based on time stamp value TS1.

In the exemplary embodiment in FIG. 1, first slave 100 forwards data packet P to second slave 200 in the fixed sequence. The same data packet P is largely unchanged between receipt and transmission. First slave 100 is configured to change time stamp value TS1 and to transmit changed time stamp value TS2 to second slave 200 in data packet P. Changed time stamp value TS2 is illustrated in FIG. 1.

First slave 100 is configured to change received time stamp value TS1 in that a first correction value OS1 is used by first slave 100. In the simplest case, first correction value OS1 is added to received time stamp value TS1, the sum of first correction value OS1 and received time stamp value TS1 being changed time stamp value TS2. In the exemplary embodiment in FIG. 1, first correction value OS1 is stored in memory area 150 of first slave 100. For example, correction value OS1 is already determined in the factory and stored in memory area 150, memory area 150 advantageously being part of a non-volatile memory, for example a flash memory. In another exemplary embodiment, correction value OS1 is ascertained during the operation of bus system 1. A slave 100, 200, 300, 400, 500, 600 in bus system 1 may receive measurement values, the measurement values being dependent, for example on propagation time delay d19 through a transmission path 810, as illustrated schematically in FIG. 3. Measurement values of multiple slaves 100, 200, 300, 400, 500, 600 of bus system 1 are advantageously evaluated by master 900. Correction value OS1 is determined by master 900, based on measurement values, and correction value OS1 is transmitted to slave 100. Insofar, a factory-set correction value OS1 is not absolutely necessary. However, a factory-set correction value OS1 is preferably stored in memory area 150, which is overwritten by a preferably more accurate, ascertained, new correction value OS1 by master 900.

Illustrated data packet P is the same data packet P, only with changed time stamp value TS2 and the changed cyclic redundancy check. Data packet P is looped through first slave 100 mainly unchanged, data packet P not being generated again and therefore retaining its structure, length and possibly packet identification. Due to the fact that first slave 100 does not have to generate a new data packet P, latencies in the transmission of time stamp value TS1, TS2 may be minimized.

Second slave 200 is configured to receive data packet P with changed time stamp value TS2 and to synchronize its timer 240, based on changed time stamp value TS2. Second slave 200 is configured to change received time stamp value TS2, based on a second correction value OS2 in its memory area 250 and to transmit changed time stamp value TS3 to third slave 300 in data packet P. New changed time stamp value TS3 is illustrated in FIG. 1. In the exemplary embodiment in FIG. 1, the same also applies to third, fourth, fifth and sixth slave 300, 400, 500, 600, which each carry out a time stamp value change. Accordingly, each slave 100, 200, 300, 400, 500, 600 is configured to change time stamp value TS . . . in data packet P and to forward the changed time stamp value to subsequent slave 200, 300, 400, 500, 600 in the sequence via bus 800. Last slave 600 in the sequence is configured to transmit data packet P back to master 900 via bus 800. Accordingly, the same data packet P is transmitted by master 900, passes through all slaves 100, 200, 300, 400, 500, 600 and in the end back to master 900, and it is received by master 900 with the aid of transceiver circuit 970. In the exemplary embodiment in FIG. 1, bus 800 is therefore designed as a ring bus.

A first interface device 180 is provided in the exemplary embodiment in FIG. 1. First slave 100 is removable from bus system 1 by detaching it from interface device 180. For this purpose, interface device 180 has, for example, electrical contacts and mechanical fastening means. The first interface device further has a first switching device 871, which effectuates a bypass from master 900 to second slave 200. When first switching device 871 is closed, and the bypass is thus activated, first data packet P is receivable, not by first slave 100, but by second slave 200 having non-modified time stamp value TS1 (not illustrated in FIG. 1) if first slave 100 is removed. The exemplary embodiment in FIG. 1 shows that one switching device 871, 872, 873, 874, 875, 876 belongs to each slave 100, 200, 300, 400, 500, 600.

By synchronizing timers 140, 240, 340, 440, 540, 640 in slaves 100, 200, 300, 400, 500, 600, a bus system time may be achieved, the individual times of timers 140, 240, 340, 440, 540, 640 of slaves 100, 200, 300, 400, 500, 600 deviating from each other only by a small error. Due to bus system 1 described above, an error of less than 10 ns may be achieved according to a measurement by the applicant.

Bus system 1 according to the exemplary embodiment in FIG. 1 is frequently used to control a process. A process image is to be determined at a point in time, using sensors or other detection devices. Preferably all analog and digital values belonging to the process are to be ascertained, preferably at the same time, via inputs 191, 291, 391, etc. Accordingly, a global sampling point (GSP) is defined for all slaves 100, 200, 300, 400, 500, 600. The more precise the synchronization of timers 140, 240, 340, 440, 540, 640 of slaves 100, 200, 300, 400, 500, 600, the smaller is the time error of the sampling points among different slaves 100, 200, 300, 400, 500, 600. The same applies to the control of actuators via outputs 192, 292, 392, etc., the output points in time for analog or digital output signals being based on timers 140, 240, 340, 440, 540, 640 of slaves 100, 200, 300, 400, 500, 600.

An advantage of the exemplary embodiment in FIG. 1 is that bus system 1 may be changed during operation, a bypass for the bus communication being activatable with the aid of switching device 871, 872, 873, 874, 875, 876 assigned to each slave 100, 200, 300, 400, 500, 600, so that bus 800 is not interrupted when a slave, e.g. 100, is removed from bus 800. For example, if first slave 100 is removed and the bypass is activated by closing switching device 871, data packet P having time stamp value TS1 passes from master 900 directly to second slave 200. Data packet P thus reaches second slave 200 at an earlier time, the propagation time delay caused by first slave 100 being almost completely eliminated for data packet P. At the same time, however, the change of time stamp value TS1 by first slave 100 is also omitted, the propagation time delay and change of time stamp value TS1 ideally almost completely canceling each other out. Accordingly, second slave 200 receives the correct time stamp value during operation, despite the removal of first slave 100, so that the global sampling point is unchanged for all remaining slaves 200, 300, 400, 500, 600, and errors and discontinuities in the process are minimized. If a slave is added to bus 800, the added slave causes a propagation time delay of data packet P. If a correction value corresponding to the propagation time delay is stored in the memory area in the added slave, the received time stamp value is immediately changed by the correction value, so that the propagation time delay and change of the time stamp value again mainly or ideally completely cancel each other out. Errors and discontinuities in the process are minimized in this case as well.

In the exemplary embodiment in FIG. 1, master 900 includes a master timer 940. Master 900 is configured to generate data packet P and to determine time stamp value TS1, based on master timer 940, and to enter it into data packet P. Since only master 900 is configured to generate data packet P, a delay caused by the start of data packet P and possibly the insertion of time stamp value TS1 may be taken into account directly during the determination of time stamp value TS1 by master 900. If master 900 simultaneously acts as a programmable logic controller (PLC) without being coupled to a higher-level bus, master 900 may autonomously define the bus system time in master timer 940. In the exemplary embodiment in FIG. 1, however, it is provided that master 900 includes another transceiver circuit 980 for communicating via a higher-level bus 700. Higher-level bus 700 may also be referred to as a field bus. Higher-level bus 700 may be designed, for example as ProfiNet, EthernetCAT, Industrial Ethernet, etc.

In the exemplary embodiment in FIG. 1, master 900 is configured to synchronize its master timer 940, based on a telegram (not illustrated) received via higher-level bus 700. The telegram is, for example, an Ethernet telegram and is thus independent of data packet P. Accordingly, the telegram and data packet P are different and are generated by different devices. The protocols of the telegram and data packet P may also be different.

Figure 2:
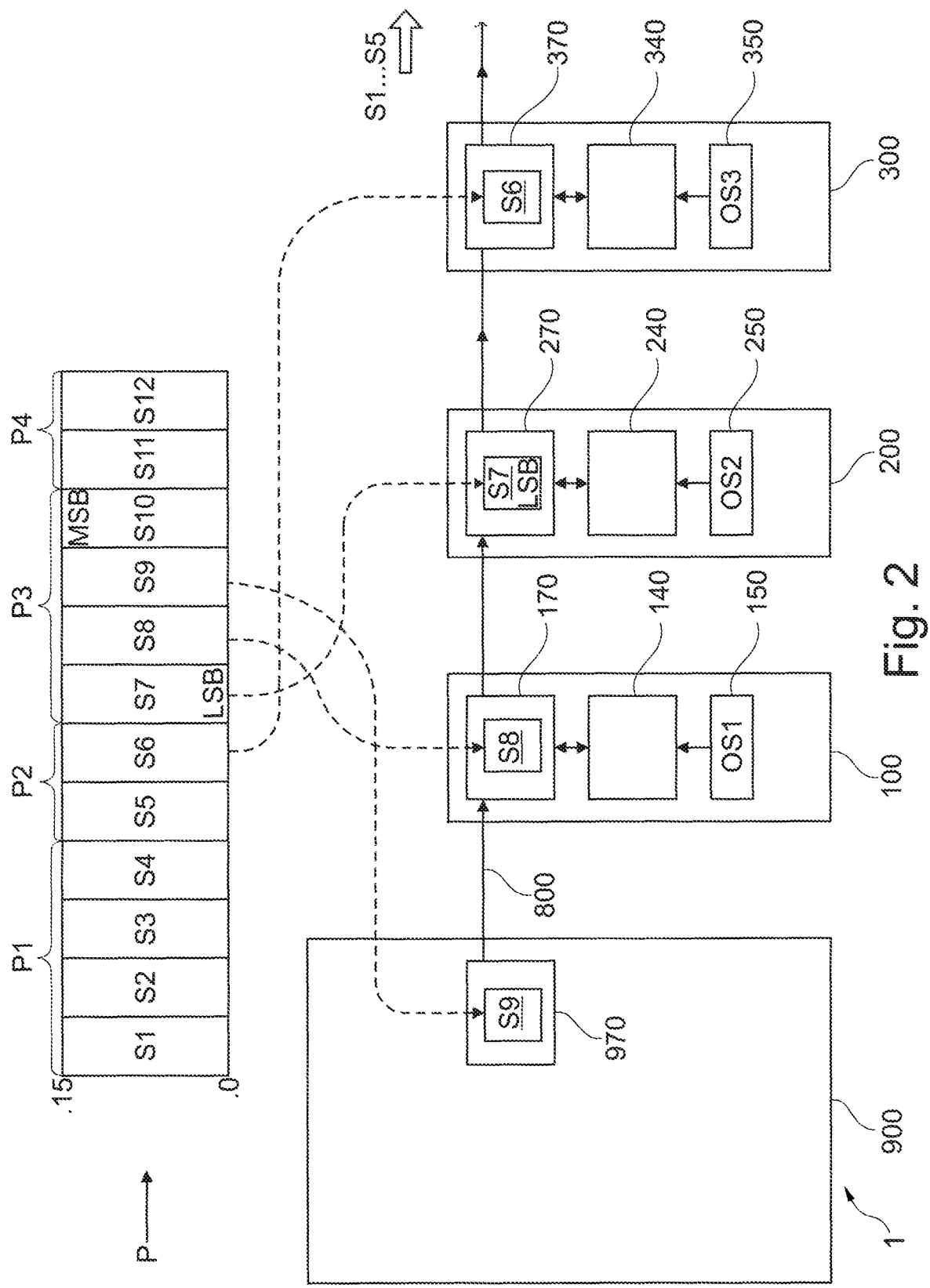
FIG. 2 shows a schematic representation of a data packet and a bus system.

FIG. 2 shows another exemplary embodiment of a bus system 1, including a schematic representation of a data packet P. Data packet P has a header P1 to be transmitted at the beginning, two data fields P2, P3 and a tail P4, for example including a CRC cyclic redundancy check. Data packet P is transmitted in data symbols S1 through S12, each having 16 bits. Data symbols S1 through S12 are transmitted in a fixed sequence, in the exemplary embodiment in FIG. 2, the transmission beginning with first data symbol S1 and ending with last data symbol S12. Data symbols S7, S8, S9 and S10 comprise a time stamp value, data symbol S7 comprising least significant bit LSB, and data symbol S10 comprising most significant bit MSB of the time stamp value.

FIG. 2 also shows bus system 1, which comprises a master 900 including a transceiver circuit 970. In the exemplary embodiment in FIG. 2, bus system 1 shows 3 slaves 100, 200, 300, and each slave 100, 200, 300 includes a transceiver circuit 170, 270, 370 for transmitting data packet P via bus 800. For transmission purposes, slaves 100, 200, 300 are configured to conduct data packet P through slaves 100, 200, 300 in a fixed sequence of slaves 100, 200, 300. In the exemplary embodiment in FIG. 2, the fixed sequence of first slave 100, then second slave 200, then third slave 300 is illustrated as an example.

At an instantaneous point in time, only one part of data packet P is in one of slaves 100, 200, 300, while a preceding part of data packet P is already in the subsequent slave. In the exemplary embodiment in FIG. 2, parts of data packet P comprise a number of data symbols S1 through S12. As an example of an instantaneous point in time, FIG. 2 shows that sixth data symbol S6 is in transceiver circuit 370 of third slave 300, subsequent seventh data symbol S7 having least significant bit LSB of the time stamp value is in transceiver circuit 270 of second slave 200, and eighth data symbol S8 is in transceiver circuit 170 of first slave 100. Accordingly, each slave 100, 200, 300 is configured to change data symbol S7 of the time stamp value received first, which has least significant bit LSB of the time stamp value, and to transmit it to a subsequent participant, third slave 300 in this case, before data symbol S10 having a most significant bit MSB of the time stamp value is received.

Data symbols S1 through S5 are already in subsequent slaves, which are not illustrated in FIG. 2. Ninth data symbol S9 is in transceiver circuit 970 of master 900. The remaining data symbols S10 through S12 are in registers of master 900 (not illustrated). For illustrative purposes, aforementioned data symbols S6 through S9 are linked by dashed arrows with data symbols S6 through S9 illustrated schematically in transceiver circuits 970, 170, 270, 370.

If data packet P continues to be transmitted in chronological sequence, ninth data symbol S9 passes from transceiver circuit 970 of master 900 to transceiver circuit 170 of first slave 100, eighth data symbol S8 passes from transceiver circuit 170 of first slave 100 to transceiver circuit 270 of second slave 200, etc. Each transceiver circuit 170, 270, 370 of slaves 100, 200, 300 is thus configured to receive and to transmit data packet P symbol by symbol. The transmission of one data symbol S1 through S12 of data packet P and the receipt of a subsequent data symbol of data packet P take place simultaneously in the exemplary embodiment in FIG. 2.

Seventh data symbol S7, including the LSB, is changed by timer 240 of second slave 200 at the instantaneous point in time illustrated in FIG. 2. The change takes place, based on correction value OS2, which is stored in memory area 250 of the second slave. Seventh data symbol S7 was previously changed by first slave 100 (not illustrated in FIG. 2). The changed time stamp value is determined by a function, using the received time stamp value and correction value OS1, OS2, OS3, etc. In the simplest cases, the changed time stamp value is determined by a sum of the received time stamp value and correction value OS1, OS2, OS3. Of course, other, for example more complex, functions are also possible in principle. In the exemplary embodiment in FIG. 2, data packet P has a large number of data symbols S1 through S15, each data symbol S1 through S15 having an, in particular, fixed number of 16 bits. Alternatively, the data symbols may also have a different fixed number of, for example, 8 or 32 bits (not illustrated in FIG. 2).

Figure 3:
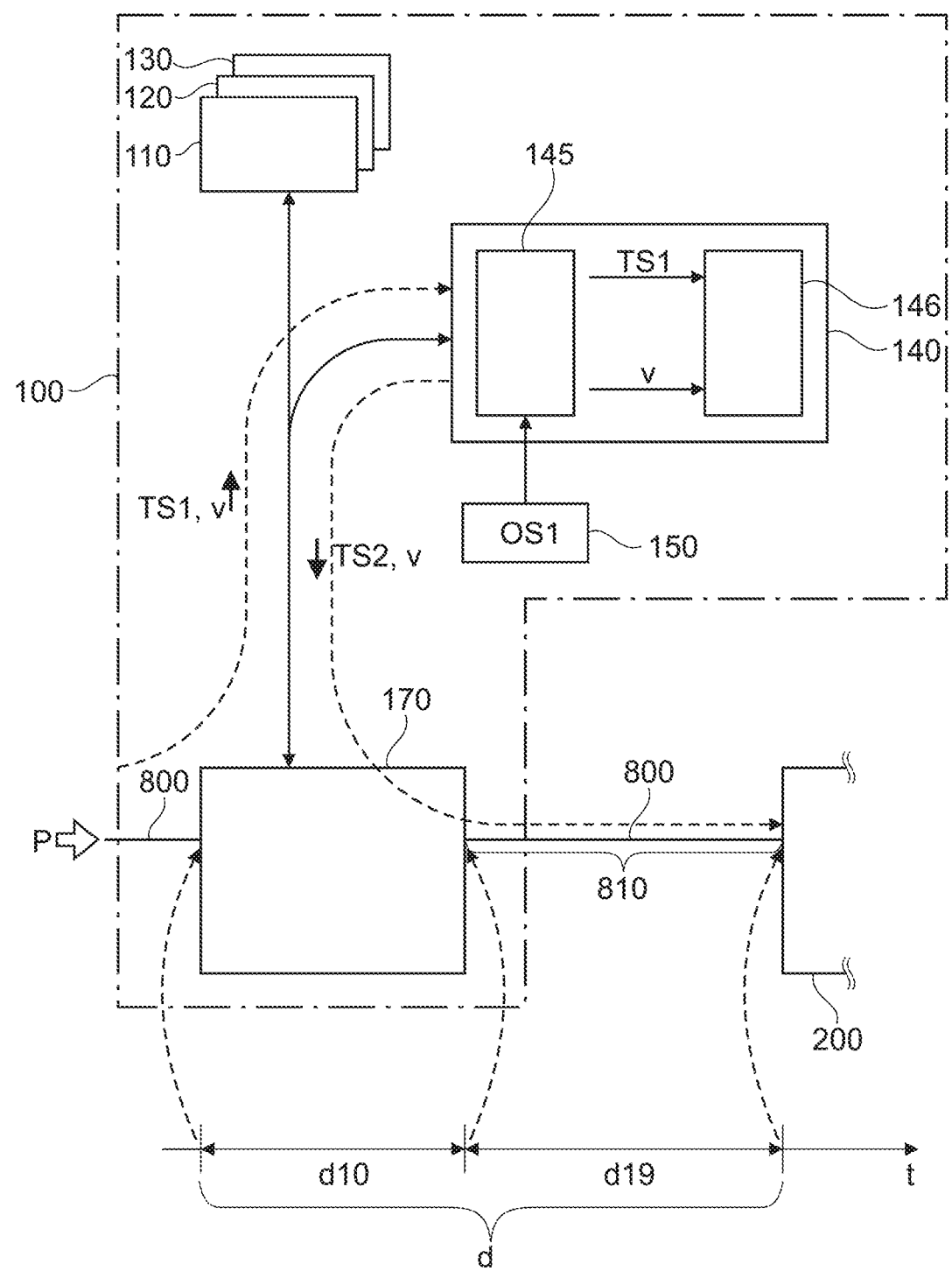
FIG. 3 shows a schematic representation of a participant of a bus system designed as a slave.

A schematic representation of a participant 100 of s bus system is illustrated in FIG. 3. Participant 100 includes a timer 140 and a transceiver circuit 170. In the exemplary embodiment in FIG. 3, participant 100 furthermore includes a plurality of arithmetic circuits 110, 120, 130, in particular state machines, for communication and/or for packet processing of data packets of different types, for example to receive, process or transmit process data. Transceiver circuit 170 is configured to receive a data packet P having a time stamp value TS1 via a bus 800. Timer 140 is configured for synchronization, based on time stamp value TS1. Time 140 is also configured to change time stamp value TS1 to a changed time stamp value TS2. Transceiver circuit 170 is configured to transmit data packet P including changed time stamp value TS2 via bus 800.

In the exemplary embodiment in FIG. 3, timer 140 of participant 100 includes a time counter 146. Time counter 146 outputs the time as a digital value, for example in nanoseconds. Timer 140 further includes a state machine 145. State machine 145 is connected to time counter 146 and is configured to synchronize time counter 146, based on received time stamp value TS1. Data packet P also contains a velocity value V, which is received with data packet P and is used by state machine 145 of timer 140 to set the velocity of time counter 146. For example, a count increment of time counter 146 may be set by velocity value V.

State machine 145 is also connected to a memory area 150 and is configured to change received time stamp value TS1. In the exemplary embodiment in FIG. 3, the memory area is part of a non-volatile memory for storing a correction value OS1, on which the change of received time stamp value TS1 is based. In the exemplary embodiment in FIG. 3, state machine 145 is configured to add correction value OS1 to received time stamp value TS1. The sum of the addition is inserted as changed time stamp value TS2 into data packet to be transmitted, in that received time stamp value TS1 is overwritten, for example, by changed time stamp value TS2.

In connection with participant 100, a schematic timing diagram, including time t and delays d10 and d19, is illustrated in FIG. 3. If data packet P reaches the input of transceiver circuit 170 of participant 100, it undergoes a propagation time delay d until the same data packet P is present at an input of subsequent participant 200. Entire propagation time delay d to be assigned to participant 100 is the sum of propagation time d10 caused by processing data packet P by circuits of participant 100 and propagation time delay d19 caused by physical transmission path 810 to next participant 200.

Propagation time delay d caused by participant 100 should be ascertained prior to receiving data packet P. For example, propagation time delay d is ascertained during manufacturing or in-factory configuration and stored in participant 100. Alternatively the ascertainment of propagation time delay d may take place during operation or during a configuration of the bus system. For example, propagation time delay d is ascertained by the participant itself, by another participant in the bus system or by a separate device (not illustrated in FIG. 3). After ascertaining propagation time delay d, a correction value OS1 is ascertained, based on ascertained propagation time delay d. In the simplest case, correction value OS1 corresponds to ascertained propagation time delay d, however a number of other values or factors may be incorporated into the ascertainment of correction value OS1, depending on the design, for example, of physical transmission path 810. Correction value OS1 is stored in memory area 150 and may be read out by timer 140. Memory area 150 is, for example, a register within an ASIC or FPGA. If correction value OS1 is stored in the memory area, the change of time stamp value TS1 is based on stored correction value OS1 for each received data packet P including time stamp value TS1.

In the case of a slave 100, according to the exemplary embodiment in FIG. 1, it is proposed that slave 100 has a clock synchronization unit (not illustrated) for clock-synchronizing a clock generator (not illustrated) to the clock signal of higher-level master 900. This clock synchronization unit is then configured to detect transitions in the downstream data flow received at the downstream data bus input for the purpose of regulating the frequency of the internal clock signal as a function of the detected transitions and to set a defined phase angle of the internal clock with respect to the detected transitions. Within the meaning of the exemplary embodiment in FIG. 1, transitions are understood to be any characteristic signal change in the data flow which may be used for clock-synchronizing the clock generator of higher-level master 900. In practice, these transitions are preferably signal edges of a digital signal when changing, e.g. from a low signal level to a high signal level, i.e. when changing from a digital zero to a digital one or vice versa. However, other characteristic signal patterns whose signal time point may be defined with an accuracy required for synchronization may also be used as transitions.

As a result, characteristic signal changes are detected in a downstream data flow, which is forwarded by higher-level master 900 to slave 100 and thus received by slave 100. Based on the detected transitions, a defined phase angle of the internal clock signal is then set with respect to the detected transitions. This means that the point in time of a characteristic signal change in the downstream data flow forms the basis for clock-synchronizing the clock generator in such a way that the detected point in time of a transition is assumed as the clock synchronization point in time, at which the phase angle of the internal clock signal is regulated.

The synchronization unit thus measures the phase angle of the transitions in the downstream data flow relative to the slave-specific clock and regulates the frequency of the slave-specific clock generator in such a way that this clock generator frequency corresponds exactly to the clock hidden in the downstream data bus signal, and a defined phase angle results between the edge changes in the downstream data bus flow and the local internal clock. The transitions detected in the downstream data bus flow are thus used as clock synchronization information for setting the slave-internal clock signal of the clock generator.

Compared to a separate synchronization message or synchronization line, the proposed clock synchronization relating to the downstream data bus flow of a higher-level master 900 has the advantage that each slave 100, 200, 300, 400, 500, 600 of a more complex bus system 1 then always clock-synchronizes its slave clock generator (not illustrated in FIG. 1) to preceding slave 100, 200, 300, 400, 500 adjacent thereto and, as a result, sets exactly the same frequency of the internal clock generators in all slaves 100, 200, 300, 400, 500, 600 in a network, regardless of the interconnection and without problems due to propagation time shifts and without a separate clock synchronization line. Only the phase angle between the clocks is not defined, due to propagation times on lines 810 as well as latencies of slaves 100, 200, 300, 400, 500, 600. Since each slave 100, 200, 300, 400, 500, 600 synchronizes the clock of its receiver to the edges in the incoming data flow, and the phase angle of the clock in the transmitter of higher-level master 900 does not play a role, an unequal phase angle of the clocks of slaves 100, 200, 300, 400, 500, 600 in bus system 1 does not present a problem.

It is particularly advantageous if the data bus interface is bidirectional and furthermore has an upstream data bus output for transmitting data to a higher-level master 900. Slave 100, 200, 300, 400, 500, 600 is thus configured not only to receive data from a higher-level master 900 in the downstream data flow but also to transmit data (back) to higher-level master 900 in the upstream data flow. For example, each slave 100, 200, 300, 400, 500, 600 has a phase angle correction unit (not illustrated in FIG. 1) for detecting transitions in the data flow receivable from the adjacent slave via the upstream data bus input (not illustrated) and to delay this upstream data flow as a function of the detection in such a way that a defined phase angle of the internal clock signal is set with respect to the transitions of the delayed data flow. The phase angle correction unit may determine the phase angle of the data flow received at the upstream data bus input, e.g. with the aid of a delay line, and to output the data flow to another slave or to master 900 via its upstream data bus output after a phase correction.

Since the clock frequency of the internal clock generator, i.e. the frequency and phase angle of the internal clock signal, is already set to the first downstream data flow, no setting of the clock generator to the upstream data flow may be achieved for the upstream data flow. Instead, it is therefore proposed to delay the total received upstream data flow in slave 100, 200, 300, 400, 500, 600, i.e. in the receiver, with the aid of the phase angle correction unit, in such a way that a defined phase angle between the internal clock signal set to the downstream data flow and the upstream data flow sets in here as well. As a result, the upstream data flow received by the adjacent slave is also clock-synchronized to the downstream data flow received by master 900, and the clock frequency and phase angle are matched.

The upstream data flow may be delayed, for example, by inserting delay elements (not illustrated in FIG. 1) or delay data into the upstream data flow. It is advantageous if the data flow is not changed but instead an electrical through-flow delay of the data signal is carried out, for example using series-connected delay elements. Delay elements of this type may be, for example, lookup tables (LUTs), FPGAs (field-programmable gate arrays) or gates in an ASIC (application-specific integrated circuit). The clock synchronization unit and the phase angle correction unit may be designed as separate hardware circuits. However, it is also conceivable that the clock synchronization unit and the phase angle correction unit are implemented as software logic, which is executed on shared or separate hardware platforms, such as microcontrollers, processors or FPGAs.

The clock synchronization unit and/or phase angle correction unit is/are preferably configured to set a defined phase angle in the range of 90° to 270° and preferably in the range of approximately 180°. The defined phase angle should be set in such a way that a sampling of the useful signal may preferably be ensured without errors. In the case of the serial data transmission in a data flow, edge steepness, transient oscillation processes and phase jitter must often be taken into account, which do not permit a signal sampling directly after a signal change. The most secure sampling of a serial data signal is therefore accurately ensured in time between the activation of a high and/or low data signal and the deactivation, i.e. precisely between the switching points in time or transitions of a data word, which corresponds to a phase angle of 180°.

The method for clock-synchronizing participants 100, 200, 300, 400, 500, 600 of a bus system 1 has the following steps: Receiving a downstream data flow from a preceding participant 100, 200, 300, 400, 500, 600 by a subsequent participant 100, 200, 300, 400, 500, 600 via a downstream data bus input; detecting transitions in the downstream data flow received at the downstream data bus input; clock-synchronizing an internal clock signal of a clock generator (not illustrated in FIG. 1) of subsequent participant 100, 200, 300, 400, 500, 600 as a function of the detected transitions; and setting a defined phase angle of the clock-synchronized internal clock signal to the detected transitions. In the exemplary embodiment in FIG. 1, it is therefore provided that both the clock synchronization of an internal clock signal of a clock generator of slave 100, 200, 300, 400, 500, 600 takes place, and a timer 140 is also able to be synchronized by a received time stamp value TS1. In the exemplary embodiment in FIG. 1, a particularly precise synchronization of timers 140 in all slaves 100, 200, 300, 400, 500, 600 may be achieved hereby.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A participant of a bus system comprising:
a timer;
a transceiver circuit configured to receive a data packet having a time stamp value via a bus;
wherein the timer is configured for synchronization, based on the time stamp value,
wherein the timer is configured to change the time stamp value to a changed time stamp value,
wherein the transceiver circuit is configured to transmit the same data packet with the changed time stamp value via the bus,
wherein the data packet includes data symbols each having a fixed number of bits, wherein a plurality of the data symbols comprise the time stamp value of the data packet, and wherein the transceiver circuit is configured to receive and to transmit the data packet data symbol by data symbol such that a transmission of one of the data symbols of the data packet and a receipt of a subsequent one of the data symbols of the data packet takes place simultaneously, and
wherein the transceiver circuit is configured to change a data symbol of the time stamp value that is received first and has a least significant bit of the time stamp value and transmit the data symbol having the least significant bit to a subsequent participant before receiving a data symbol of the time stamp value having a most significant bit of the time stamp value.

2. The participant according to claim 1, wherein the timer includes a time counter, and wherein the timer includes a state machine which is configured to synchronize the time counter based on the time stamp value and to change the time stamp value to the changed time stamp value.

3. The participant according to claim 1, further comprising a non-volatile memory area for storing a correction value, on which the change of the time stamp value is based.

4. The participant according to claim 3, wherein the correction value is based on a delay between the receipt and the transmission of a beginning of the data packet by the transceiver circuit and based on a delay due to the transmission via a transmission path of the bus to a subsequent participant.

5. The participant according to claim 3, wherein the correction value is constant for consecutive data packets.

6. A method for operating a bus system, the method comprising:
providing a first participant;
providing a second participant;
receiving and transmitting a data packet by the first participant;
synchronizing a timer of the first participant based on a time stamp value received in the data packet;
changing the time stamp value to a changed time stamp value by the first participant; and
transmitting the changed time stamp value by the first participant to the second participant via the same data packet,
wherein the bus system has a first interface device, the first participant being removable from the bus system by detaching the first participant from the first interface device, and
wherein the first interface device includes a first switching device which effectuates a bypass to the second participant so that the data packet is receivable not by the first participant but rather by the second participant with an unchanged time stamp value if the first participant is removed.

7. The method according to claim 6, wherein the time stamp value is changed by the first participant during the transmission and the receipt of the data packet.

8. The method according to claim 6, wherein a propagation time delay caused by the first participant is ascertained prior to the receipt of the data packet, wherein a correction value is ascertained based on the propagation time delay, wherein the correction value is stored, and wherein the change of the time stamp value is based on the correction value.

9. The method according to claim 8, wherein a further propagation time delay caused by a transmission path between the first participant and the second participant is ascertained prior to the receipt of the data packet, and wherein the correction value is ascertained based on the propagation time delay and the further propagation time delay.

10. The method according to claim 9, wherein the changed time stamp value is determined by summing the time stamp value and the correction value.

11. A bus system comprising:
a first participant configured as a first slave;
a second participant configured as a second slave;
a master;
a bus; and
a first interface device, wherein the first slave is removable from the bus system by detaching the first slave from the first interface device,
wherein the master and the first slave and the second slave are connected via the bus to transmit a data packet such that the data packet transmitted by the master passes through the first slave and the second slave in a fixed sequence,
wherein the master is configured to transmit a time stamp value in the data packet,
wherein the first slave is configured to receive the data packet with the time stamp value,
wherein the first slave is configured to synchronize a timer of the first slave based on the time stamp value,
wherein the first slave is configured to change the time stamp value to a changed time stamp value and to transmit the changed time stamp value to the second slave in the data packet,
wherein the second slave is configured to receive the data packet with the changed time stamp value and to synchronize a timer of the second slave based on the changed time stamp value, and
wherein the first interface device includes a first switching device which effectuates a bypass to the second slave so that the data packet is receivable not by the first slave but rather by the second slave with an unchanged time stamp value if the first slave is removed.

12. The bus system according to claim 11, further comprising:
at least two additional slaves,
wherein the data packet passes through all of the at least two additional slaves of the bus system in a fixed sequence,
wherein each slave is configured to successively change the time stamp value in the data packet and to forward the data packet to the subsequent slave in the sequence via the bus,
wherein the last slave in the sequence is configured to transmit the data packet back to the master via the bus.

13. The bus system according to claim 11, wherein the master includes a master timer, and wherein the master is configured to generate the data packet and to determine the time stamp value based on the master timer and to enter the time stamp value into the data packet.

14. The bus system according to claim 13, wherein the master includes a transceiver circuit connected to a higher-level bus, and wherein the master is configured to synchronize the master timer based on a telegram received via the higher-level bus.

* * * * *